United States Patent [19]

Janik et al.

[11] Patent Number: 5,614,091
[45] Date of Patent: Mar. 25, 1997

[54] FUEL FILTER MASTER MODULE WITH OPTIONAL DIVERTER CAPABILITY

[75] Inventors: Leon P. Janik, Suffield; M. Craig Maxwell, Colchester; Robert W. Zeiner, Torrington, all of Conn.

[73] Assignee: Stanadyne Automotive Corp., Windsor, Conn.

[21] Appl. No.: 315,910

[22] Filed: Sep. 30, 1994

Related U.S. Application Data

[63] Continuation-in-part of Ser. No. 166,226, Dec. 13, 1993, Pat. No. 5,484,527.

[51] Int. Cl.$^6$ ................................................. B01D 35/02
[52] U.S. Cl. ...................... 210/249; 210/251; 210/418; 210/438
[58] Field of Search ........................... 210/171, 196, 210/436, 433.1, 434, 438, 251, 418, 249; 123/179.7, 179.9; 220/288, 298, 303, 304; 248/94

[56] References Cited

U.S. PATENT DOCUMENTS

| | | | |
|---|---|---|---|
| 3,237,770 | 3/1966 | Humbert, Jr. | 210/438 |
| 3,494,340 | 2/1970 | Weber et al. | 123/179.7 |
| 4,259,419 | 3/1981 | Uba et al. | 156/69 |
| 4,746,025 | 5/1988 | Krautkramer et al. | 156/73.1 |
| 5,017,285 | 5/1991 | Janik et al. | 210/438 |

FOREIGN PATENT DOCUMENTS

| | | | |
|---|---|---|---|
| 0529782A1 | 3/1993 | European Pat. Off. | |
| 4032758A1 | 4/1992 | Germany | |
| 211656 | 2/1924 | United Kingdom | 220/304 |

*Primary Examiner*—Matthew O. Savage
*Attorney, Agent, or Firm*—Chilton, Alix & Van Kirk

[57] ABSTRACT

A filter module for filtering a flow of fluid employs a base member which either mounts a blanking plug or a diverter valve module. The plug is replaced by a diverter valve module for use with those engines that require an auxiliary source of low pressure fuel. A solenoid valve is housed in the module. A pressure regulator valve positioned in the valve module maintains a backpressure in the filter assembly to insure that there is sufficient head to drive the flow of fuel to the engine.

8 Claims, 4 Drawing Sheets

FUEL FILTER MASTER MODULE WITH OPTIONAL DIVERTER CAPABILITY

This is a continuation-in-part of application Ser. No. 08/166,226, filed Dec. 13, 1993 now U.S. Pat. No. 5,484,527.

BACKGROUND OF THE INVENTION

This invention relates generally to devices for filtering and separating liquids. More particularly, the present invention relates to filters for filtering fuel or lubricating oil of an internal combustion engine and removing foreign particles and separating water therefrom.

The absence of high standards of quality control in diesel fuel supplies dictates that an effective fuel filter be incorporated into the fuel supply system of a diesel engine. It is not uncommon for diesel fuel to have significant quantities of abrasive particles and water. The abrasive particles present the potential for permanent damage to components of the fuel injection pump. The abrasive particles can also adversely affect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components. Similarly, water and particulate matter in the lubricating oil must be removed to minimize wear of engine parts.

Commonly, filters employ a disposable filter cartridge which is replaced at pre-established intervals of filter usage. The cartridge is secured to a base that is fixedly mounted to the engine header or some other fixed location.

Some engine designs require a source of low pressure fuel during certain operating events, particularly while starting a cold engine. The low pressure fuel is generally supplied by an injection fuel pump located between the fuel filter and the engine.

SUMMARY OF THE INVENTION

Briefly stated, the invention in a preferred form is a filter module comprising a base member which comprises a receptacle adaptable to mount either a blanking plug or a diverter valve module for a cold climate start igniter. The plug may be replaced by the valve module for use with those engines that require a source of low pressure fuel during certain phases of operation. The lower portion of the valve module is inserted into the base member receptacle. The valve module is then turned approximately 90° to engage locking tabs on the valve module with flanges on the base member. Locating the valve module at the filter eliminates loss of head in the line due to friction and also reduces the number of required fittings in the fuel line. The base member design ensures efficient fluid flow operation through the filter and fuel lines for both the diverter module and the plug configurations.

The diverter valve module provides a source of low pressure fuel flow to the engine. A solenoid operated valve is housed in a compartment in the upper portion of the module housing. In a preferred application, the solenoid valve selectively opens to provide an auxiliary source of fuel during engine startup. A pressure regulator valve is housed in a second compartment in the lower portion of the module housing. A diverter path is defined in the valve module. The pressure regulator valve maintains a backpressure in a chamber to ensure that there is sufficient head to drive the diverted fuel flow to the intake manifold of the engine or for other applications.

The base member functions in part as a fuel line junction and therefore has a number of fluid line connectors. The receptacle leads from a central chamber which is configured to provide fluid communication with the diverter valve module if required. In one embodiment for a cold climate start igniter application, a first outlet connector connects with an outlet line to provide fluid communication with the fuel injection pump. A pump return connector connects with a return line to provide fluid communication with the fuel injection pump via the pump return passageway. A portion of the fuel flow from the fuel injection pump is thereby returned to the filter assembly. The pump return passageway is in fluid communication with the chamber located in the base member via a first control orifice. The first orifice is sized to regulate the return flow from the fuel injection pump. A second outlet connector connects with an outlet line to provide fluid communication with the fuel tank via the fuel tank return passageway. A portion of the fuel flow is returned to the fuel tank thereby. The fuel tank return passageway is in fluid communication with the base chamber via a second control orifice. The second orifice is sized to restrict the return flow to the fuel tank.

A locking mechanism is employed to lock the blanking plug or the diverter valve module to the receptacle. The locking mechanism may take the form of pairs of catches and locking tabs.

The base module is assembled with a mounting module, a disposable filter cartridge and either a blanking plug or a diverter valve module to constitute a filter assembly such as may be especially adapted for incorporation into the fuel supply system or lubricating oil system of an internal combustion engine, such as a diesel engine, for removing particulate matter from the fuel or oil and for separating water from the fuel or oil.

An object of the invention is to provide a new and improved filter master module which is readily adaptable for mounting or not mounting a diverter valve module which provides auxiliary fuel communication with an engine or other related unit as the production requirements vary.

Another object of the invention is to provide a new and improved filter module wherein a diverter valve module may be mounted at the filter assembly, thereby diminishing the magnitude of pressure and heat losses and the extent of mounting hardware between a filter assembly and a cold climate start igniter which are characteristic of conventional related systems.

A further object of the invention is to provide a new and improved master module having efficient and effective means for selectively diverting fuel from a fuel supply line system.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
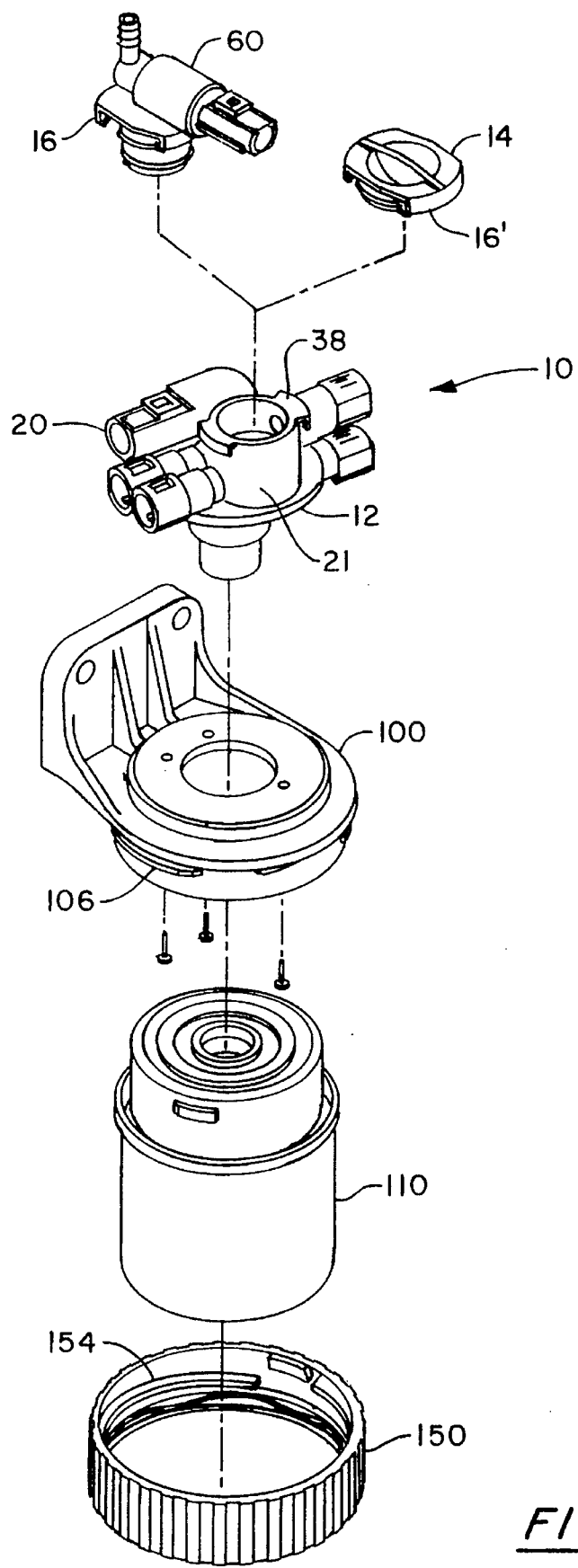
FIG. 1 is an exploded view of a modular fuel filter assembly in accordance with the present invention.

With reference to the drawings wherein like numerals represent like parts throughout the several figures, a modular filter assembly in accordance with the present invention is generally designated by the numeral 10. With reference to FIG. 1, a filter base module 12 is assembled with a mounting module 100, a disposable filter cartridge 110 and either a blank cap-like plug 14 or a diverter valve module 60 to form the modular filter assembly 10. In a preferred embodiment, the filter assembly 10 is especially adapted for incorporation into the fuel supply system or lubricating oil system of an internal combustion engine (not illustrated), such as a diesel engine, for removing particulate matter from the fuel or oil and for separating water from the fuel or oil.

The filter assembly is adaptable to be readily configured during production with either the blanking plug 14 or the diverter valve module 60 which may have numerous applications. In one preferred application, the module 60 diverts a supply of low pressure fuel to the intake manifold 11 for a cold climate start igniter (not illustrated). The mounting module 100 is fixedly mounted to the engine or other fixed location of the vehicle. Filter cartridge 110 is secured to the mounting module by means of a retainer collar 150.

With reference to FIG. 1, the filter base module 12 comprises a base member 20 which readily receives and fluidically seals with either a plug 14 or a diverter valve module 60 as the production requirements may dictate during a production cycle. For example, the plug 14 may be replaced by a diverter valve module 60 for use with those engines that require a source of low pressure fuel for ignition in an intake manifold igniter during cold engine starting. This modularity provides great flexibility and reduced costs during the manufacturing of the filter assembly 10 and during the assembly line production due to the ready adaptability to either incorporate or not incorporate the diverter valve module as production requirements vary. The base member 20 and the blanking plug 14 are precision molded from a polymeric material, for example, Valox DR-48™, Ultradur B-4300-G4™, or RTP 1103™. The housing 66 for the valve module 60 may be molded from polymeric material or composed of metal.

Figure 2:
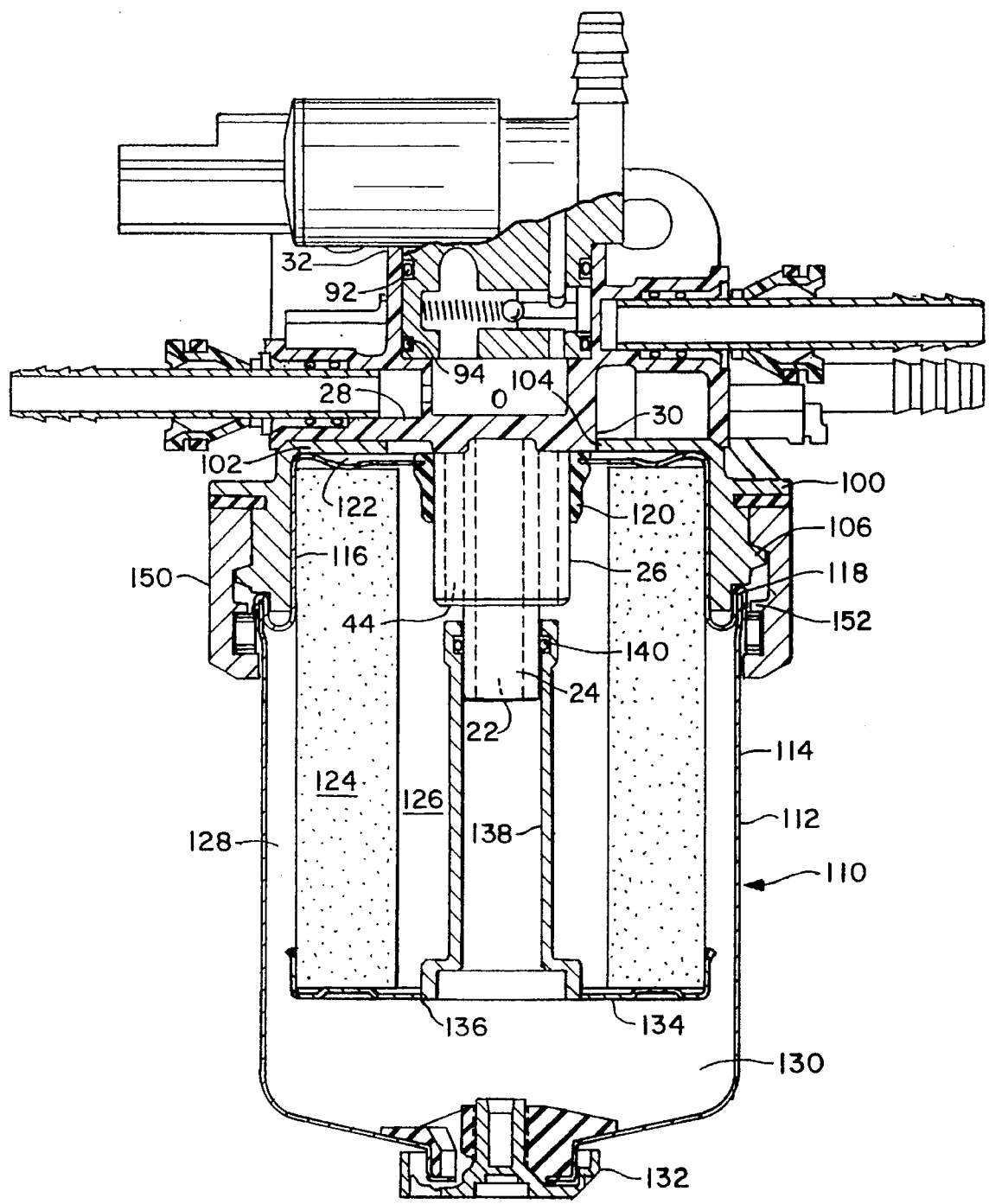
FIG. 2 is an enlarged sectional view, partly in phantom, of the filter assembly of FIG. 1 assembled with the mounting module, diverter valve module, base module and filter cartridge of FIG. 1.
Figure 3:
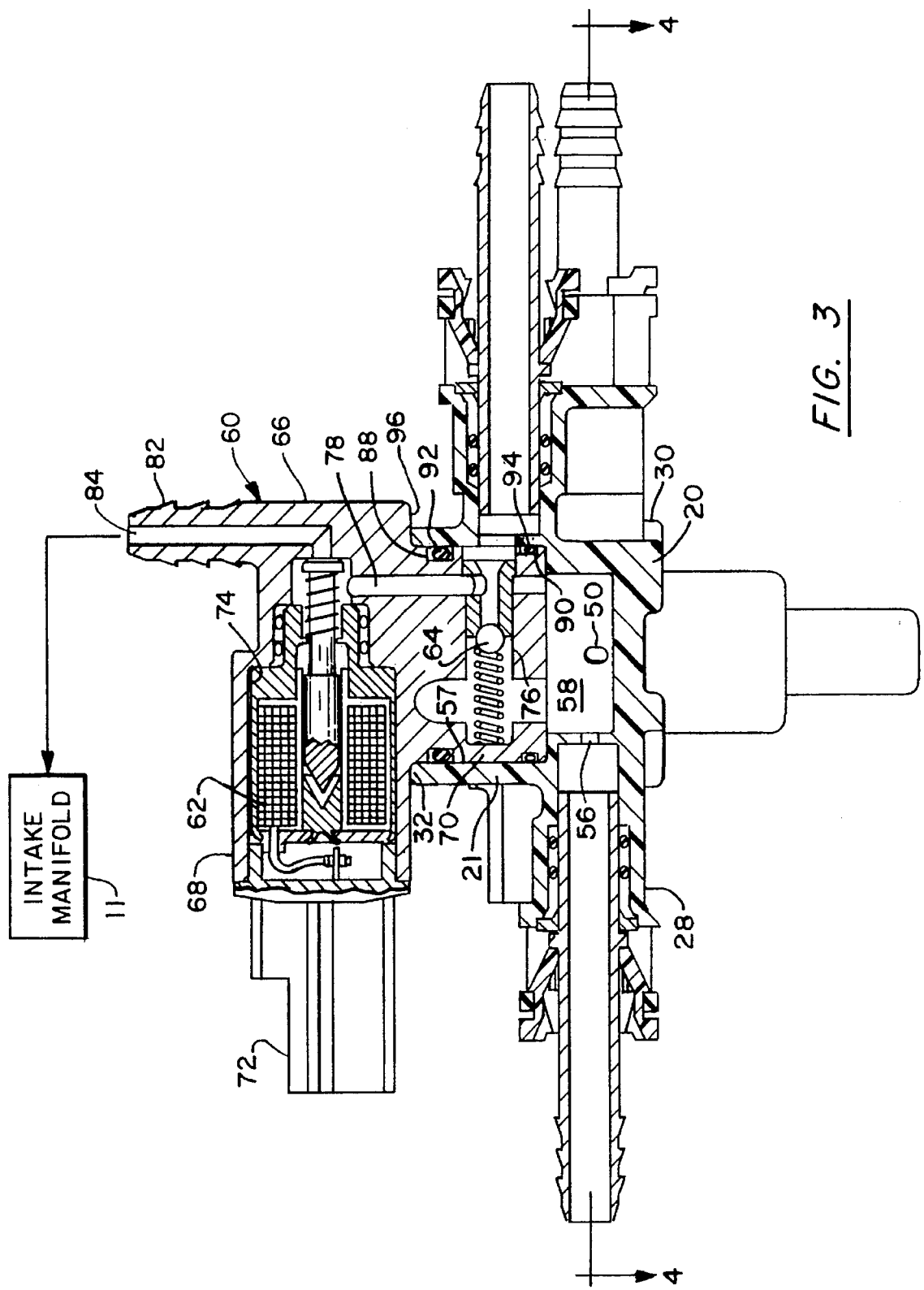
FIG. 3 is an enlarged sectional view, partly in schematic, of the assembled base module and diverter valve module of FIG. 2 and a line to an engine intake manifold.
Figure 4:
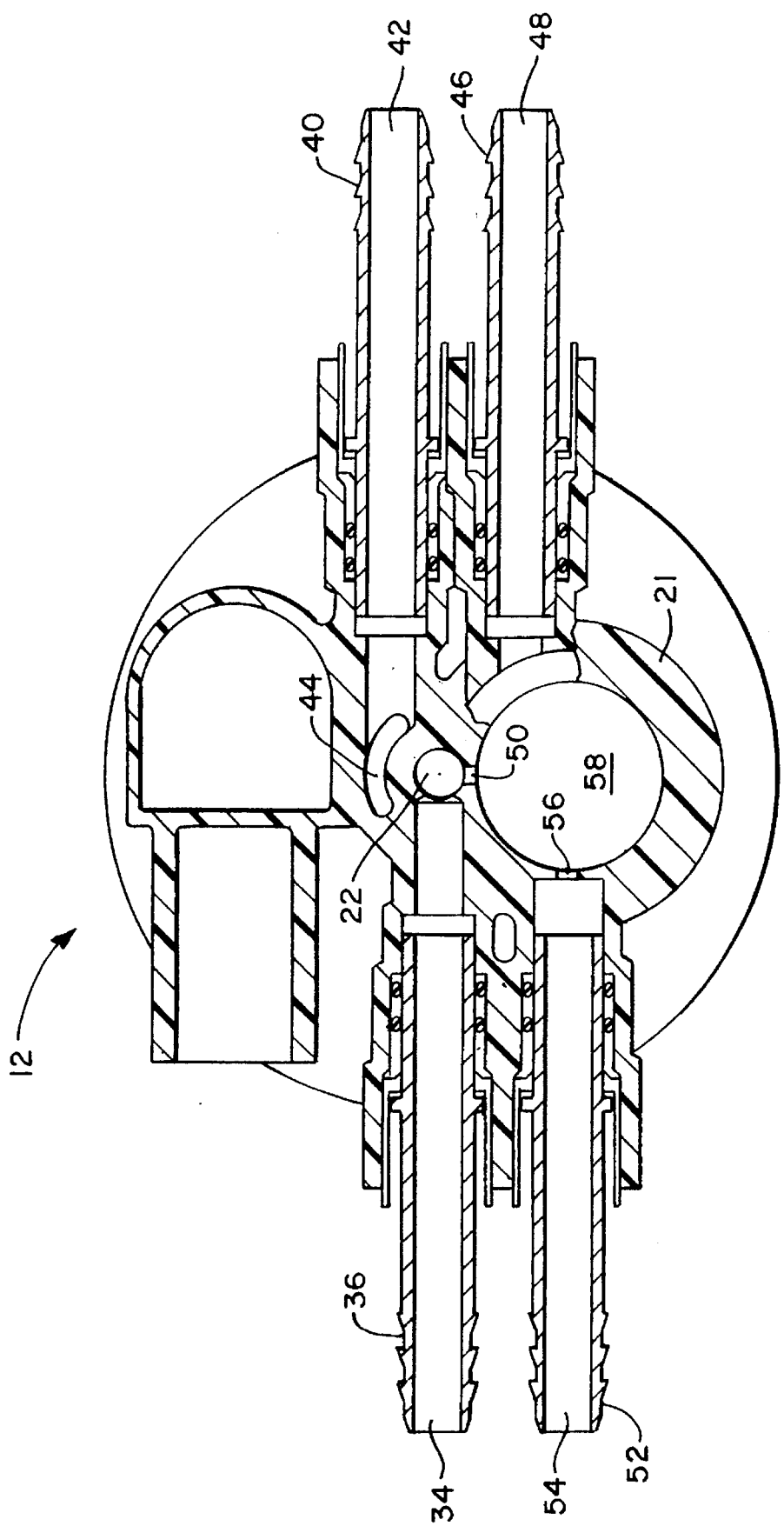
FIG. 4 is a sectional view of the filter base module of FIG. 3 taken along the line 4—4 thereof.

With reference to FIG. 2, the base member 20 is an integral member which in part functions as a fluid line junction. The base member 20 mounts and provides fluid communication means with the filter cartridge 110. The base member 20 comprises an elongated sleeve-like first conduit 24 defining a central axial bore or inlet flow channel 22, an intermediate concentric sleeve-like second conduit 26 of reduced length, a coupling plate 28 and a locating ring 30. As shown in FIGS. 3 and 4, the upper portion of the base member 20 has a cylindrical receptacle 21 defining an upper cavity 57 and a lower chamber 58, wherein the cylindrical receptacle is spaced apart from and separate of the inlet flow channel 22 and the first inlet passage 34. The receptacle 21 upwardly terminates in a circumferential lip 32. If the plug is installed, the upper lip 32 of the base member abuts an annular ring of the plug 14 to seal the receptacle. If the valve module 60 is installed, a lower portion 70 of the valve module 60 is closely received in the first cavity 57 of the receptacle and the base member upper lip 32 abuts a shoulder 96 of the module housing 66. The plug 14 and the valve module housing 66 each have locking catches 16, 16' which angularly engage outwardly projecting tabs 38 of the base member 20 (FIG. 1). First and second O-rings 92, 94 housed in first and second grooves 88, 90 on the valve module housing lower portion 70 provide a fluid tight connection with respect to the base member 20.

The first and second conduits 24 and 26 provide generally co-axial fluid communication between the filter module 10 and the disposable cartridge 110. With additional reference to FIG. 4, a first inlet passage 34 includes an inlet connector 36 at a filter module side location for connection with a supply line from the fuel tank (not shown). The inlet passage 34 provides fluid communication with the cartridge via the axial central bore 22 defined by the first conduit 24.

A first outlet connector 40 at a filter module side location connects with an outlet line (not shown) to provide fluid communication with the fuel injection pump (not shown) via passageway 42 from the axial fluid conduit 44 defined between the first and second conduits 24 and 26. A return connector 46 at a filter module side location connects with a return line (not shown) to provide fluid communication with the fuel injection pump via passageway 48. A portion of the fuel flow from the fuel injection pump is thereby returned to the chamber 58 in the base member 20. A first control orifice 50 located in chamber 58 regulates the return flow from the fuel injection pump. In a preferred embodiment, the first orifice has a diameter of 4 mm. A second outlet connector 52 at a filter module side location connects with an outlet line (not shown) to provide fluid communication with the fuel tank via passageway 54. A portion of the fuel flow is returned to the fuel tank thereby. Passageway 54 is in fluid communication with the chamber 58 of the receptacle via a second control orifice 56. In a preferred embodiment, the second control orifice 56 has a diameter of 2 mm to restrict the return flow to the fuel tank.

The diverter valve module 60 selectively provides a source of low pressure fuel flow to the engine. The valve module 60 snaps into position and seals in the base member receptacle cavity 57 after being turned 90° to lock the catches 16 with the tabs 38. With reference to FIG. 3, a solenoid operated valve 62 is housed in a first cavity or compartment 74 in the upper portion 68 of the module housing 66. The upper portion 68 and the lower portion 70 of the housing 66 are oriented in generally orthogonal relationship. The solenoid valve 62 is connected to the ignition (not shown) via an electrical connector 72. A signal from a temperature controller and a starter solenoid causes the solenoid valve 62 to energize, opening the valve and allowing a flow of low pressure fuel to the engine intake manifold 11.

A pressure regulator in the form of a pressure relief valve 64 is housed in a second compartment 76 in the lower portion 70 of the module housing 66. A diverter path 78 extends from the chamber to an outlet connector 82 via relief valve 64 and diverter valve 62. The relief valve 64 maintains a backpressure in the filter assembly 12 to insure that there is sufficient head to drive the fuel flow to the engine. In a preferred embodiment, a suitable backpressure is approximately 12.5 kpa. An outlet connector 82 extends in a generally axial offset relationship to the lower mounting portion 70 and connects with an outlet line to provide fluid communication with the engine via passageway 84.

With reference to FIG. 2, the mounting module 100 is generally located at the underside of the base module 12. The mounting module 100, which may be cast from metal, comprises a coupling plate 102 having an aperture 104 for receiving the first and the second conduits 24 and 26 and the locating ring 30. The mounting module 100 includes a pair of integral outwardly projecting, diametrically disposed ramps 106. Each of the ramps ascends in spiral-like fashion in excess of 90° around the mounting module 100. The upper ends of the ramps are beveled. Stops (not shown) are angularly spaced from the respective upper ends of the ramps 106. The base module 12 and mounting module 100 define an inverted cup-like receptacle having a lower receiving cavity for the upper portions of the disposable cartridge.

The disposable filter cartridge 110 comprises a can-like container 112 which is formed by a pair of lower and upper cup-like metal sections 114, 116 which are joined along a circumferential roll seam 118. The truncated upper section 116 is a molded member which includes a central axial opening. An upper sealing grommet 120 mounted at the opening inwardly seals against the outer conduit 26. The top surface of container section 122 is contoured to form an annular recess.

A filter element 124 which has a continuous fan-shaped pleated configuration is housed within the container 112. The filter element 124 axially extends approximately three quarters of the length of the container 112. The filter element 124 thus defines an interior axial chamber 126 and quasi-annular outer chamber 128. The filter element 124 is affixed with resin binders or other water coalescers so that as fuel or oil passes through the filter element 124, the water coalesces to form water droplets. A water barrier may also be employed. A sump 130 is formed at the bottom of the lower section 114 to collect water which coalesces from the fuel or oil. A drain valve 132 is disposed in the sump 130 for draining the water.

The lower end of the filter element 124 is engaged by a plate 134 which has a central port 136. A tubular structure 138, coaxial to the central port 136, engages the plate 134 and extends upward a part of the length of the interior axial chamber 126. The tubular structure 138 coaxially receives a lower portion of the inner conduit 24 wherein the vertical gap between the lower end of the outer conduit 26 and the upper exterior end of the tubular structure 138 defines a passage for the flow of fuel or oil out of the filter element 124 via the axial fluid conduit 44. A lower sealing grommet 140 mounted adjacent the upper end of the tubular structure 138 inwardly seals against the inner conduit 24. Alternatively, the disposable cartridge may comprise dual filter elements (not illustrated) and other filter configurations.

The retainer collar 150 includes a rim-like shoulder 152 for retentively engaging the roll seam 118. Spiral-like ramps 154 of the collar 150 are dimensioned and positionable for engagement with the ramps 106 and stops of the mounting module 100, so that the collar ramps 154 slideably engage and ascend the mounting module ramps 106 upon alignment and angular rotation of the collar 150. The inclination angle of the upper surfaces of the mounting module ramps 106 and the underside surfaces of the collar ramps 154 are constant and substantially equal. The upper ramp surfaces of the mounting module ramps 106 and the underside surface of the retainer collar ramps 154 engage along an extended substantially surface-to-surface interface. The locked position may be facilitated by the leading end of the collar ramps 154 engaging the stops.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter base assembly adapted for mounting filter cartridge means including filter means for filtering a flow of fuel in a fuel injection system for an internal combustion engine, the system including a fuel injection pump and a fuel tank, said base assembly comprising:

a filter base member including opposed upper and lower sides, whereby the filter cartridge means is mounted to said lower side, a first conduit extending from said lower side and defining an inlet flow channel for connection to an inlet side of the filtering means, a second conduit extending from said lower side and surrounding said first conduit to form an annular outlet flow channel therewith for connection to an outlet side of the filtering means, first inlet means for connecting the fuel tank to the inlet flow channel of said first conduit, first outlet means for connecting an inlet side of the fuel injection pump with said annular outlet flow channel, said base member including a cylindrical receptacle formed into said upper side and defining an upper cavity and a lower chamber wherein the cylindrical receptacle is spaced apart from and separate of said inlet flow channel and said first inlet means, second inlet means for connecting a return side of the fuel injection pump to said upper cavity, second outlet means for connecting the fuel tank to said lower chamber, and closure means for sealably closing said receptacle.

2. The filter base assembly of claim 1 wherein said closure means comprises a plug.

3. The filter base assembly of claim 2 wherein said closure means further comprises a second portion, said first and second portions being disposed in generally orthogonal relationship wherein said second portion is adjacent said base member.

4. The filter base assembly of claim 3 wherein said closure means further comprises a solenoid operated valve disposed in said second portion.

5. The filter base assembly of claim 4 wherein said closure means further comprises an auxiliary outlet and further comprising diverter path means for defining a diverter passage extending from said chamber to said auxiliary outlet.

6. The filter base assembly of claim 5 wherein said solenoid valve selectively controls fluid communication through said auxiliary outlet.

7. The filter base assembly of claim 5 wherein said closure means further comprises pressure regulating means for regulating pressure in said diverter passage.

8. The filter base assembly of claim 1 wherein said closure means comprises a first portion received in said cylindrical receptacle.

* * * * *